United States Patent [19]
Pirchl

[11] Patent Number: 5,981,082
[45] Date of Patent: Nov. 9, 1999

[54] HEAT SHIELD

[76] Inventor: Gerhard Pirchl, Seestrasse 341, CH-5708 Birrwil, Switzerland

[21] Appl. No.: 08/515,711

[22] Filed: Aug. 16, 1995

[30] Foreign Application Priority Data

Aug. 17, 1994 [DE] Germany ............... 44 29 104

[51] Int. Cl.$^6$ ............ B32B 15/00; B32B 15/02; B21D 13/00; B23K 101/18
[52] U.S. Cl. ............ 428/603; 428/593; 428/594; 29/17.4; 228/59
[58] Field of Search ............ 428/564, 594, 428/593, 603; 29/17.4; 244/158 R, 158 A; 182/47; 228/59; 432/65

[56] References Cited

U.S. PATENT DOCUMENTS

| | | |
|---|---|---|
| 1,789,819 | 1/1931 | Jones . |
| 3,084,770 | 4/1963 | Wirsing .............. 189/34 |
| 3,151,712 | 10/1964 | Jackson .............. 189/34 |
| 3,190,412 | 6/1965 | Rutter et al. .............. 189/85 |
| 3,507,634 | 4/1970 | O'Driscoll .............. 29/191.4 |
| 3,799,056 | 3/1974 | Colignon .............. 102/105 |
| 3,884,646 | 5/1975 | Kenney .............. 29/191.4 |
| 4,164,605 | 8/1979 | Okawa et al. .............. 428/593 |
| 4,344,591 | 8/1982 | Jackson .............. 244/158 A |
| 4,701,114 | 10/1987 | Andersen et al. .............. 417/564 |
| 4,987,736 | 1/1991 | Ciokajlo et al. .............. 60/39.31 |
| 5,041,720 | 8/1991 | Esposito .............. 219/443 |
| 5,083,424 | 1/1992 | Becker .............. 60/39.31 |
| 5,108,817 | 4/1992 | Kidd et al. .............. 428/192 |
| 5,157,893 | 10/1992 | Benson et al. .............. 52/792 |
| 5,211,013 | 5/1993 | Bonde et al. .............. 60/323 |
| 5,392,625 | 2/1995 | Cesaroni .............. 72/57 |

FOREIGN PATENT DOCUMENTS

| | | |
|---|---|---|
| 0439046 | 7/1991 | European Pat. Off. . |
| 2193170 | 2/1974 | France . |
| 25 49 722 A1 | 5/1977 | Germany . |
| 92 03 734 | 8/1993 | Germany . |
| 762800 | 12/1956 | United Kingdom . |

*Primary Examiner*—John J. Zimmerman
*Assistant Examiner*—Michael LaVilla
*Attorney, Agent, or Firm*—Venable; George H. Spencer; Robert Kinberg

[57] ABSTRACT

A heat shield. The heat shield includes a supporting sheet metal piece having edges, an inner surface and an outer surface; a cover foil fastened on the edges of the sheet metal piece so as to define a thermally insulating air gap with the inner surface of the sheet metal piece; and spacers arranged on the sheet metal piece and projecting into the insulating air gap from the inner surface of the sheet metal piece.

12 Claims, 5 Drawing Sheets

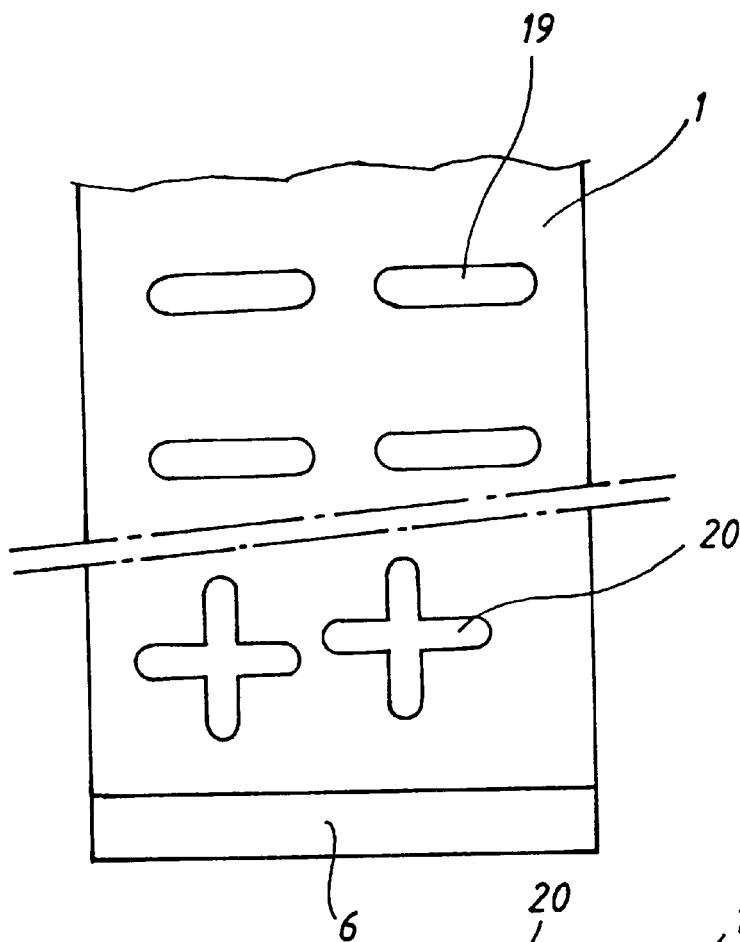
FIG 6
FIG 7
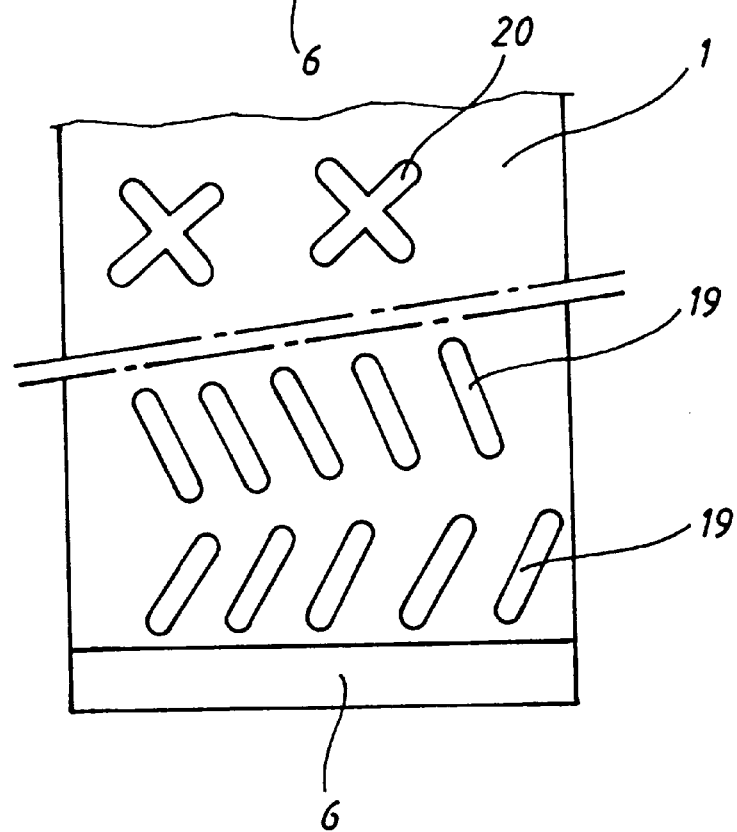
FIG 8
FIG 9

HEAT SHIELD

FIELD OF THE INVENTION

The invention relates to a heat shield and a method of making a heat shield.

BACKGROUND OF THE INVENTION

Such heat shields are used in the automobile field to accomplish heat insulation, e.g., between an exhaust, a catalytic converter and the oppositely disposed vehicle components, e.g., a vehicle floor or the like.

EP 0 439 046 shows that it is known to create a heat shield as described above from a foil package, wherein a pad-like member is present, comprising a plurality of metal foils forming a stack, the metal foil layers being arranged one above another in a vertical direction above a sheet metal piece.

Here, the metal foils are embossed so as to form air gaps between the individual metal foil layers, which gaps are intended to considerably improve the insulating effect of the pad-like member.

However, in the above prior art arrangement, the insulating effect is not at an optimum because the embossed metal foils rest directly on the supporting sheet metal piece, and, as a result, produce an undesirable heat transmission therewith.

SUMMARY OF THE INVENTION

It is therefore the object of the invention to considerably improve the heat-insulating effect of such a heat shield such as the heat shield described above.

To accomplish the above object, the invention pertains to a heat shield and a method of making the heat shield. The heat shield includes a supporting sheet metal piece having edges an inner surface and an outer surface; a cover foil fastened on the edges of the sheet metal piece so as to define an insulating air gap with the inner surface of the sheet metal piece; and spacers arranged on the sheet metal piece and projecting into the insulating air gap from the inner surface of the sheet metal piece.

It is an essential characteristic of the invention that corresponding spacer means are arranged on the supporting sheet metal piece for creating a distance, (i.e., for creating an insulating air gap) between the supporting sheet metal piece and the cover foil, the spacer means thus keeping the cover foil above them at a distance from the supporting sheet metal piece.

According to a first embodiment of the invention, no further assemblies are present in the air gap between the supporting sheet metal piece and the cover foil arranged thereabove. Thus, the insertion of a foil stack in the air gap between the sheet metal piece is dispensed with and a clean, clear air gap is present which is defined between the supporting sheet metal piece and the cover foil. The spacer means mentioned above are provided to maintain the air gap.

In another embodiment of the present invention, a foil stack is additionally placed into the air gap, an important feature of the embodiment being however, that this foil stack should not come into contact with the edge of the supporting sheet metal piece so as to prevent an undesirable heat conduction from the hot supporting sheet metal piece to the foil stack placed in the air gap.

It is an essential characteristic of the above embodiment that spacer means are arranged between the supporting sheet metal piece and the embossed metal foils arranged thereabove and which form the stack, so that the air gap between the inner side of the supporting sheet metal piece and the associated side of the first foil disposed opposite of the supporting sheet metal piece is enlarged considerably.

The different embodiments embodiments of the spacer means include a first preferred embodiment which comprises deeply drawn embossments provided on the supporting sheet metal piece which embossments are arranged so as to be uniformly distributed over the surface of the supporting sheet metal piece and so as point inwardly (i.e. towards the metal foils). As a result, the first foil resting on the supporting sheet metal piece is lifted off of the supporting sheet metal piece, and an air gap having a relatively large cross section is thus created.

Tests conducted concerning the above invention have shown that such an air gap improves insulation values dramatically.

In order to achieve a specific insulation value, it is necessary that approximately four embossed foils be arranged as a package above a supporting sheet metal piece.

However, if the novel method and a heat shield produced according to the method are used, then two embossed metal foils are required given an otherwise identical design.

It has turned out to be advantageous if an aluminum sheet metal piece is used as supporting sheet metal piece.

In a further embodiment of the invention it is preferred if the aluminum sheet metal piece is highly polished on its side facing the heat source so as to ensure an even better heat dissipation.

Apart from the embossments proposed above, corresponding spacer means may be inserted on the smoothly configured supporting sheet metal piece as a further spacer means such as, e.g., metal elements, and foam elements, particularly rigid foam elements, which are heat resistant.

Instead of the point-shaped embossments, which are illustrated here and are preferably used, strip-shaped or line-shaped embossments may also be used, having the same spacer effect as the point-shaped embossments.

The spacer surface in the direction of the forming air layer should be as small as possible. Therefore point-shaped embossments are preferred. However, as previously mentioned, the invention is not limited to the above configuration of the embossments. Elongated, oval or rectangular embossments, or continuous embossments may also be used.

Moreover, in a modification of the present invention, it is preferred if, in a three-dimensional heat shield that is, a heat shield having bending regions, the embossments are disposed particularly in the bending regions so as to accomplish a spacing effect in the bending regions—with these regions being critical for the heat shielding effect.

Thus, according to the invention, a substantially square or rectangular hollow section of a transverse member of the heat shield may be reshaped into an elongated, for instance, oval or elliptic shape so that, with this novel connection contour of the abutting surface, a flawless connection can be accomplished in this manner by means of electron beam welding. Apart from the oval deformation, differently shaped deformations can also be produced such as, e.g., hexagonally, octagonally or similarly polygonally deformed sections, all of which are characterized by the fact that they essentially do not have wall sections oriented parallel to the electron beam.

BRIEF DESCRIPTION OF THE DRAWINGS

The invention is described in greater detail below by way of the drawings which illustrate several ways of implementing the invention. Further essential characteristic features and advantages of the invention ensue from the drawings and their description where:

FIG. 6 shows a plan view of a modified embodiment of a supporting sheet metal piece;

FIG. 7 shows a modified embodiment of the supporting sheet metal piece of FIG. 6;

FIG. 8 shows yet another modified embodiment of the supporting sheet metal piece of FIG. 6;

FIG. 9 shows a further modified embodiment of the supporting sheet metal piece of FIG. 6.

DETAILED DESCRIPTION OF THE INVENTION

Figure 1:
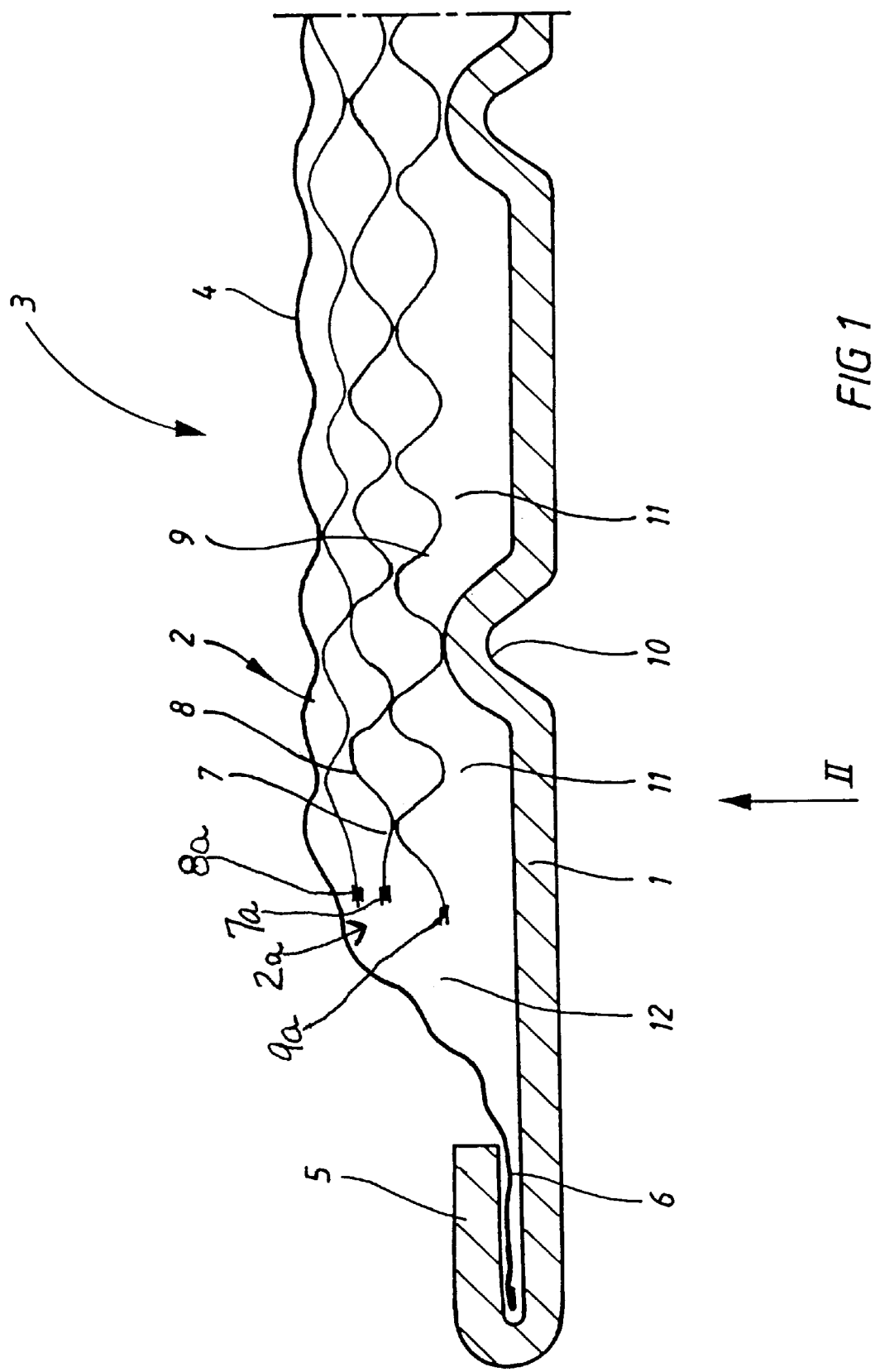
FIG. 1 shows a schematic, cross sectional view through a portion of a heat shield according to a first embodiment of the invention.
Figure 2:
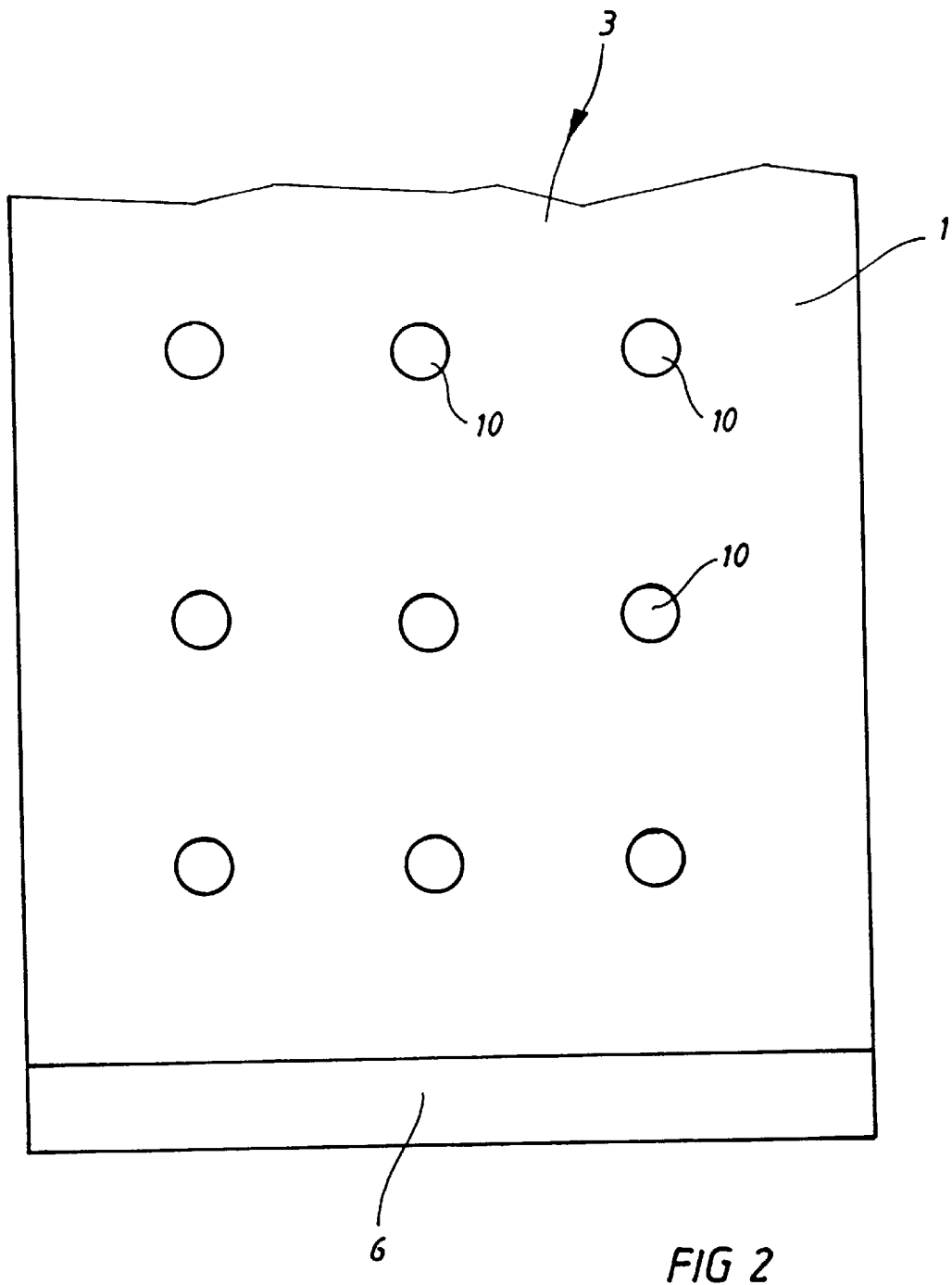
FIG. 2 shows a plan view of the heat shield of FIG. 1 in the direction of arrow II.

According to FIGS. 1 and 2, the heat shield 3 comprises a supporting sheet metal piece 1 on which a foil package 2 is arranged. The foil package 2 comprises a plurality of foils 7, 8, 9, all of which are embossed.

The upper region of the foil package 2 is formed by the cover foil 4 which is configured either identically to the foils 7, 8, 9, so as to present a continuous smooth surface and provided with a greater thickness than one of the foils 7, 8, 9. Here, the cover foil 4 is clamped in a gap 6 of a flanged edge 5 on the supporting sheet metal piece 1, thus holding the entire foil package 2 on the supporting sheet metal piece 1.

For the creation of an air gap 11 according to the invention, embossments 10 are arranged in the supporting sheet metal piece. These which embossments point inwardly toward the foils and thus lift the foil package 2 off of the supporting sheet metal piece. Here, the supporting surface of the respective embossment 10 is preferably made to be as small as possible at the respectively inner foil 9, with point-shaped embossments 10 being preferred accordingly, as is illustrated in FIG. 2.

Thus, a large first air gap is created between the supporting sheet metal piece 1 and the immediately adjacent inner foil 9, which air gap produces a substantial insulating effect that cannot be accomplished otherwise with similar foils. The heat acts upon the supporting sheet metal piece 1 in the direction of arrow II in FIG. 1.

As shown in FIG. 1, foil package 2 has an edge region 2a in which the individual foils 7, 8, 9 have edges 7a, 8a and 9a, respectively, which are free of contact with one another, the supporting sheet metal piece 1 and foil cover 4, and are spaced from flange 5 to define a further air gap 12 which also ensures the insulating effect in this edge region.

Figure 3:
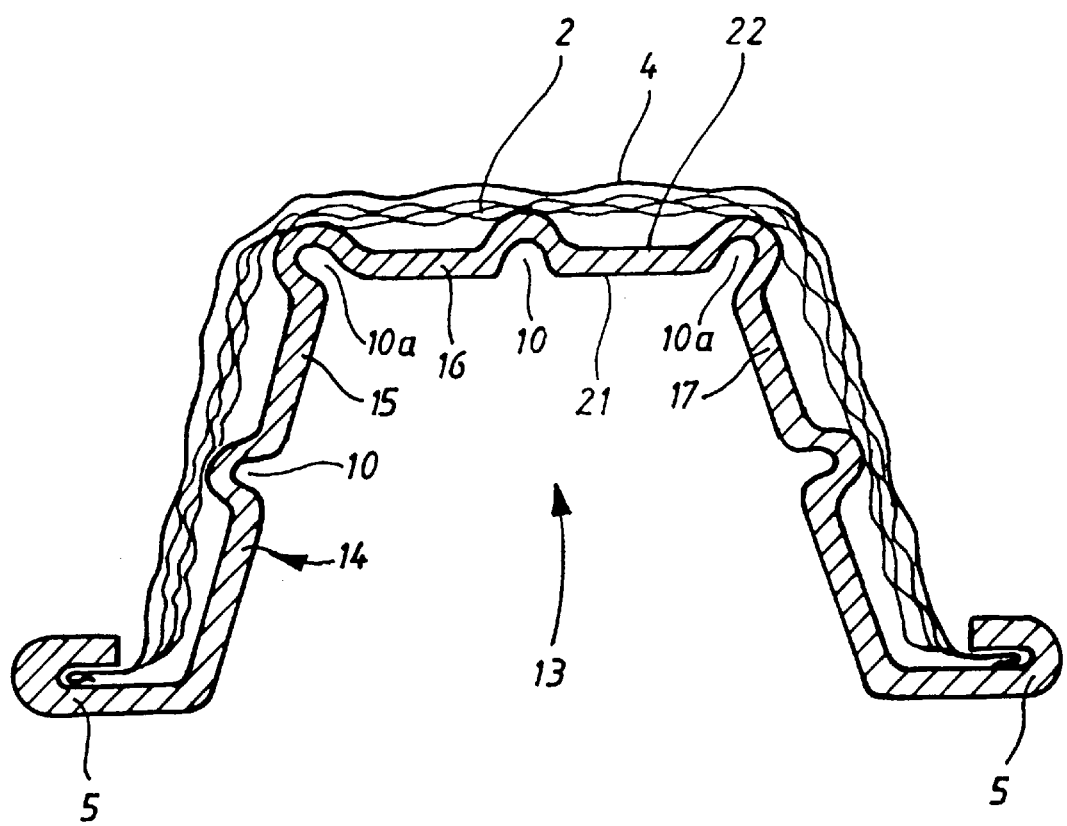
FIG. 3 shows a schematic, cross-sectional view through a heat shield according to a further embodiment of the invention.

FIG. 3 shows a further heat shield 13 which is bent three-dimensionally (i.e., so as to include bending regions) which is approximately U-shaped. Heat shield 13 thus comprises legs 15, 16, 17. Legs 15 and 17 form the flanged edges 5 at their outer sides, foil package 2 being clamped into the flanged edges.

It is important that, in addition to the embossments 10 in the region of the legs 15, 16, 17, which embossments are distributed in the manner shown in FIG. 2, still further embossments 10a are provided, which are arranged in the bending regions, i.e., in each transition region between the respective leg 15 and 16 or 16, 17. In this manner, a spacing effect vis-a-vis the foil package 2 is accomplished in these bending regions and, accordingly, the insulating effect of the heat shield is improved considerably.

In all embodiments it is, of course, not necessary to arrange the embossments 10 in a line shape or grid shape; they may also be arranged in a staggered manner.

Likewise, it is not necessary to implement a uniform distance between the embossments 10; the embossments 10 can thus be arranged in the supporting sheet metal piece 1 at nonuniform distances from one another.

Figure 4:
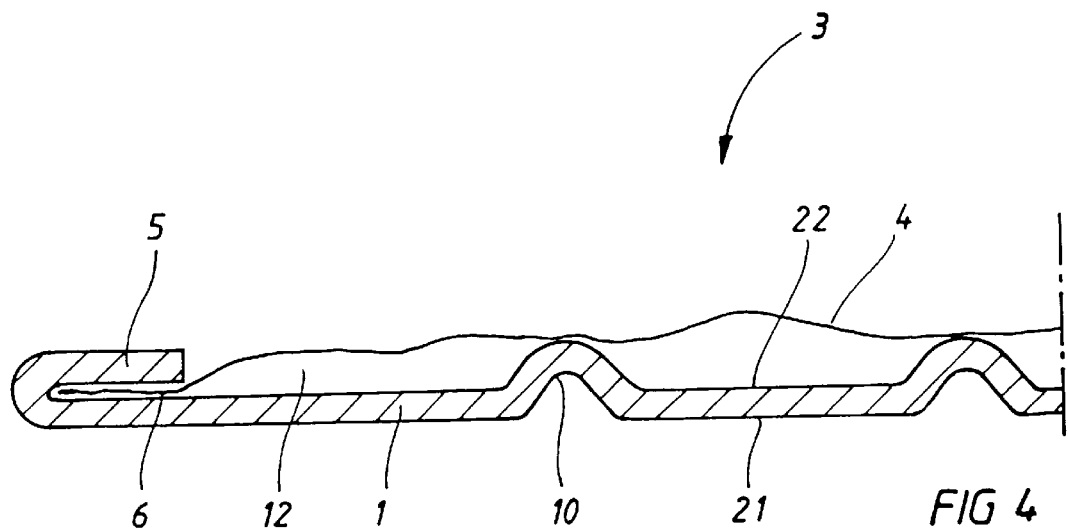
FIG. 4 shows a schematic, cross-sectional view through a heat shield according to yet a further embodiment of the invention.

As a variation to the above embodiment, FIG. 4 shows a heat shield 3 comprising merely a supporting sheet metal piece 1 and a cover foil 4 arranged thereabove. The insulating gap 12 comprises only air and does not contain any further components such as, e.g., a foil package 2.

In the above embodiment, merely the inner surface 22 may be highly polished or both inner surface 22 and outer surface 21 facing the heat source may be highly polished.

Figure 5:
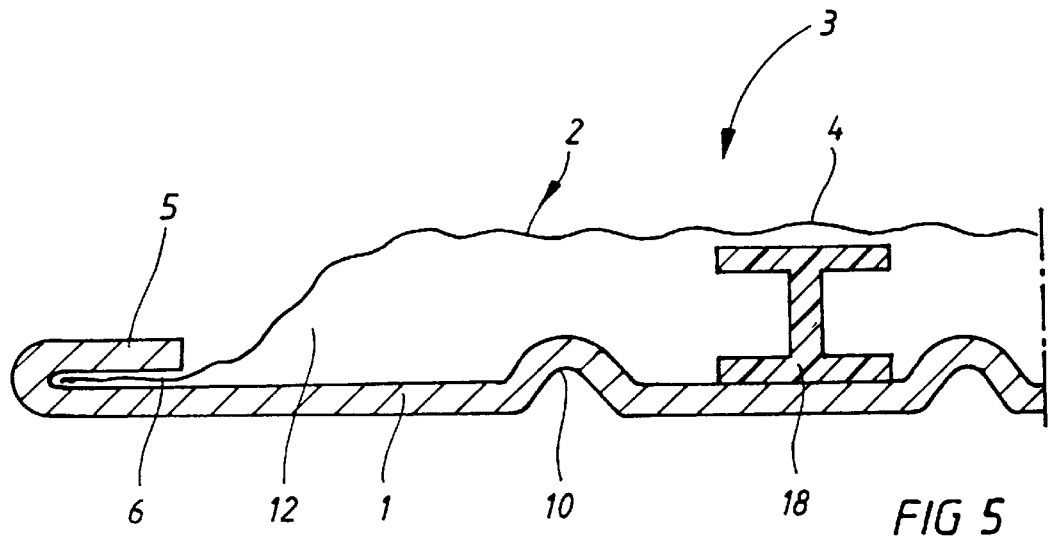
FIG. 5 shows a schematic, cross-sectional view through a heat shield according to yet another embodiment of the invention.

FIG. 5 illustrates that spacer elements 18 may also be installed in the insulating air gap 12. These spacer elements maybe heat-insulating inserts comprised of rigid foam elements or of another material. The spacer elements may further be connected to the supporting sheet metal piece 1 such as by gluing, riveting or the like.

FIG. 6 illustrates that instead of the point-shaped embossments 10, 10a, short embossments 19 extending in longitudinal direction may also be provided, the embossments being arranged at a distance parallel to one another.

FIG. 7 shows that the embossments may also be cross-shaped, such as embossments 20.

FIG. 8 shows that the embossments 20 may also be distributed on the surface of the supporting sheet metal piece 1 at a slant with respect to one another; and FIG. 9 shows that the embossments 19 may also be arranged parallel to, crosswise or at a slant with respect to one another.

The mentioned embossments 10, 10a and the embossments 19, 20 are always pressed out of the material of the supporting sheet metal piece 1 by means of a molding process and they project at least partially into the insulating air gap 11, 12. Thus, the above embossments are integrally formed from the surface of the sheet metal piece, as seen from the Figures (i.e.: the sheet metal piece, including the embossments, is a one-piece component).

To accomplish the object of the invention, it is not necessary here that the cover foils 4 rest against the respective surface of the embossment 10, 10a or of the embossment 19, 20 according to FIG. 7. Thus, as is illustrated in FIG. 5,—the cover foil 4 may be arranged at a distance from the tips of the embossments 10 or the embossments 19, 20, even where the spacer elements 18 is not present in FIG. 5.

In the above embodiment, the cover foil 4 is arranged at a distance from the embossments 19, 20 projecting into the air gap 11, 12, with no further assemblies being present in the air gap 11, 12.

In all of the cases mentioned above, it may be provided that the inner surface 22 or the surface 21 of outer supporting sheet metal piece 1 facing the heat source is configured to be highly polished.

It is then possible to accomplish a considerably improved heat insulation effect with the heat shield according to the invention.

I claim:

1. A heat shield comprising:
    a supporting sheet metal piece having edges, an inner surface and an outer surface;
    a cover foil fastened to the edges of the sheet metal piece and defining a thermally insulating air gap consisting of air with the inner surface of the sheet metal piece;
    a foil package consisting essentially of a plurality of foils disposed in the air gap between the supporting metal piece and the cover foil, the foils of the foil package each having an edge, the edge of each foil of the foil package being free of contact with the supporting sheet metal piece, the cover foil and with each other edge of the respective foils of the foil package; and
    spacer means, independent of the foil package, being arranged on the sheet metal piece and projecting into the insulating air gap from the inner surface of the sheet metal piece for enlarging a distance between the sheet metal piece and the foil of the foil package disposed directly opposite the sheet metal piece.

2. The heat shield according to claim 1, wherein at least some of the spacer means are integrally formed from the sheet metal piece.

3. The heat shield according to claim 2, wherein the at least some of the spacer means comprise circular embossments.

4. The heat shield according to claim 1, wherein the supporting sheet metal piece and the cover foil fastened thereto are bent thereby defining bending regions.

5. The heat shield according to claim 4, wherein a number of the spacer means are disposed in the bending regions.

6. The heat shield according to claim 1, wherein the outer surface of the sheet metal piece is polished.

7. The heat shield according to claim 1, wherein the inner surface of the sheet metal piece is polished.

8. The heat shield according to claim 1, wherein the at least some of the spacer means comprise elongated embossments.

9. The heat shield according to claim 1, further comprising a foil stack disposed in the air gap between the cover foil and the sheet metal piece such that heat conduction between the sheet metal piece and the foil stack is substantially prevented.

10. The heat shield according to claim 1, wherein at least some of the spacer means comprise insulating spacer elements disposed in the inner surface of the sheet metal piece.

11. The heat shield according to claim 1, wherein the foils of the foil package contact one another at regions of embossments.

12. A heat shield comprising:
    a supporting sheet metal piece having edges, an inner surface and an outer surface;
    a cover foil fastened to the edges of the sheet metal piece and defining a thermally insulating air gap with the inner surface of the sheet metal piece;
    a foil package consisting essentially of a plurality of foils disposed in the air gap between the supporting metal sheet piece and the cover foil, the foils of the foil package each having an edge, the edge of each foil of the foil package being free of contact with the supporting sheet metal piece, the cover foil and with each other edge of the respective foils of the foil package, with the foils of the foil package contacting one another at regions of embossments; and
    spacer means, independent of the foil package, being arranged on the sheet metal piece and projecting into the insulating air gap from the inner surface of the sheet metal piece for enlarging a distance between the sheet metal piece and the foil of the foil package disposed directly opposite the sheet metal piece.

* * * * *